United States Patent [19]
Martin

[11] Patent Number: 5,264,679
[45] Date of Patent: Nov. 23, 1993

[54] ALTERNATING CURRENT WELDING APPARATUS

[76] Inventor: Donald L. Martin, 16882 Armstrong Ave., Irvine, Calif. 92714

[21] Appl. No.: 878,835

[22] Filed: May 4, 1992

[51] Int. Cl.$^5$ .............................................. B23K 9/073
[52] U.S. Cl. ............................. 219/130.4; 219/130.51
[58] Field of Search ........... 219/130.4, 130.51, 137 PS

[56] References Cited

U.S. PATENT DOCUMENTS 4,963,715 10/1990 Tuttle ............................... 219/130.4

Primary Examiner—Clifford C. Shaw

[57] ABSTRACT

Disclosed is a TIG welding apparatus having an electrode connected to a power supply which applies to the electrode a predetermined voltage of either a negative or positive polarity. Control logic controls the electrode polarity to create a welding phase with the electrode at a negative polarity, a cleaning phase with the electrode at a positive polarity, and a momentary power off phase as the polarity of the electrode is switched. An arc initiation unit reestablishes the arc after start up when the polarity of the electrode is switched from a negative and a positive polarity. This arc initiation unit includes a transformer circuit having a primary and a secondary winding, a capacitor, and charging means to charge the capacitor while the electrode is at negative polarity, means to isolate electrically the charging means from the power supply when the polarity of the electrode is positive, and means for discharging the capacitor through the primary winding. The capacitor discharge is enabled with each transition of the polarity of the electrode from negative to positive, and discharged when the voltage of the electrode reaches a predetermined level to provide good welding performance.

18 Claims, 3 Drawing Sheets

ALTERNATING CURRENT WELDING APPARATUS

BACKGROUND OF THE INVENTION

1. Field of the Invention

This invention relates to an alternating current welding apparatus that includes unique circuitry for initiating a direct current-electrode positive arc. This eliminates the use of a continuous high frequency or complex auxiliary power supplies at low current welding.

2. Background

In one type of electric arc welding commonly referred to as Tungsten Inert Gas (TIG) welding, an arc is struck between a non-consumable electrode, for example, a tungsten electrode, and a workpiece in the presence of an inert shielding gas. It is desirable to initiate the welding arc without physical contact between the electrode and the workpiece. This is most commonly accomplished by coupling a high voltage, low current, high frequency signal to the electrode. The high voltage ionizes the shielding gas and provides a path for arc initiation. There are a number of problems with this method, including electrical interference with electronic equipment in the vicinity of the arc, arc wander, and erosion, particularly of aluminum workpiece surfaces. When welding with direct current, the high frequency signal is required only to initiate the arc, so it is often turned off a short time after the arc is initiated. It may be automatically reapplied if the arc goes out.

Since the high frequency signal is a serious source of interference, a high voltage impulse has, in some instances, been used in place of the high frequency signal. The high voltage impulse is often derived from the discharge of a capacitor which has been charged to a high voltage. This impulse signal is usually inductively coupled to the weld circuit by a special transformer.

Direct current TIG welding is normally accomplished with the electrode negative with respect to the workpiece. This results in the electron flow from the electrode (usually treated to enhance electron emission) to the workpiece. The electron stream heats the workpiece and results in a highly concentrated, deep penetration weld. The electrode is bombarded by positive ions in the shielding gas which clean the electrode surface of contamination. When welding some materials, particularly aluminum, there is a serious problem with rapid oxide formation on the workpiece surface. This oxide contaminates the weld, reducing the weld quality. The use of direct current with the electrode positive eliminates the surface contamination through the cleaning effect of the positive ions. This, however, results in excessive electrode heating and produces a wandering arc with shallow penetration.

To overcome these problems, alternating current is commonly used to weld materials (particularly aluminum) encountering this problem. This provides the penetration of electrode negative welding with electrode positive cleaning. Since the arc voltage and current pass through zero with each change of electrode polarity, the arc must be reignited each cycle. Reignition with the electrode negative is usually spontaneous, because the electrode is a good electron emitter with a small cross-section, the electrode and workpiece surfaces are hot, and ionized gas is present. Reignition with the electrode positive is much more difficult. The aluminum surface is not a good electron emitter, and with flat workpieces, the surface does not concentrate the electric field. With moderate weld currents and normal welding supply voltages, the arc will not reignite spontaneously. Consequently, it is customary to use a high frequency voltage to produce reignition. The continuous use of high frequency brings with it the problems of electromagnetic interference with control and communication equipment and results in a surface erosion which may reduce the strength of the weld.

Another method to reignite the electrode positive arc is to increase the arc voltage and provide initiating current by series connection of the electrode to an auxiliary power supply. The voltage required is in excess of 150 volts and significant current is available. This is an expensive solution and results in electrode voltages and current capabilities that may be hazardous to the weldor.

SUMMARY OF THE INVENTION

It is the objective of this invention to reignite an electrode positive arc reliably and simply with a minimum of electrical interference and hazard to the weldor.

The welding apparatus of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its advantages, which include safety and simple and low cost circuitry.

The first, and central feature of this invention, is an arc reignitiation circuit including means responsive to the polarity of a welding electrode reversing polarity. The arc reignitiation circuit applies an electrical impulse of short duration to the electrode to produce an arc between the electrode and the workpiece after an initial arc has been extinguished by a reversal in polarity. In the preferred embodiment, this arc reignitiation circuit includes means which controls the application of the electrical impulse to the electrode, so that this reignition impulse is applied to the electrode when the voltage differential across the electrode and the workpiece is sufficiently large to sustain an arc. There are means providing a clock signal which indicates when the polarity of the electrode reverses. This clock signal enables the control means.

The second feature of this invention is a power supply coupled to a polarity control unit for controlling the polarity of the voltage at the welding electrode. The polarity control unit includes switch means for switching polarity at the electrode. A control circuit controls the operation of the switch means in a predetermined manner to create a welding phase, a cleaning phase, and, preferably, a momentary power off phase as the polarity of the electrode is switched between negative and positive.

The third feature is means for coupling the start and reignition signals into the electrode circuit. In the preferred embodiment this coupling means is a transformer. The transformer has a secondary winding, a first primary winding coupled to a first capacitor, and a second primary winding coupled to a second capacitor. The first capacitor discharges at start up to produce in the secondary winding a first voltage impulse which is applied to the electrode. The second capacitor discharges when the arc current goes through zero during polarity reversal to produce in the secondary winding a second voltage impulse which is also applied to the electrode. The first voltage impulse applied to the electrode at start up is higher that the second voltage impulse. At start up a negative polarity is applied to the electrode, and a positive polarity is applied to the electrode when the arc is reestablished. The transformer has a core which saturates rapidly when a low current flows through the secondary winding.

The fourth feature is there are means to charge a capacitor to a moderate voltage while the electrode is at negative polarity so that the voltage across the electrode and the workpiece does not exceed about 1500 volts at reestablishment of the arc. This capacitor is discharged through the transformer with each transition of the polarity of the electrode from negative to positive. The discharge of the capacitor is in response to the voltage across the electrode and workpiece reaching a predetermined level to reestablish and maintain the arc.

The welding apparatus of this invention provides an impulse signal to the electrode which is synchronized with the polarity reversals and which has a polarity and amplitude sufficient to ignite the arc with the electrode positive. By using an impulse source such as a capacitor discharge to initiate the arc, the energy may be restricted to a very short time period and controlled to restrict the bandwidth. This, of course, requires that the discharge be timed to most efficiently initiate the arc. Only a single impulse is needed to initiate each electrode positive cleaning pulse. Since the electrode and the workpiece are both heated as a result of the preceding electrode negative arc, the voltage required is 10 to 15 times lower than that needed to initiate the start of weld arc with the electrode negative. This relatively low voltage greatly reduces the potential for electrical interference with other equipment. The current required is very low and the source has characteristics similar to a capacitor discharge automotive ignition system. This low current availability greatly reduces the operator hazard.

BRIEF DESCRIPTION OF THE DRAWING

The preferred embodiment of this invention, illustrating all its features, will now be discussed in detail. This embodiment depicts the novel and non-obvious welding apparatus of this invention shown in the accompanying drawing, which is for illustrative purposes only. This drawing includes the following figures (Figs.), with like numerals indicating like parts.

DESCRIPTION OF THE PREFERRED EMBODIMENT

Figure 1:
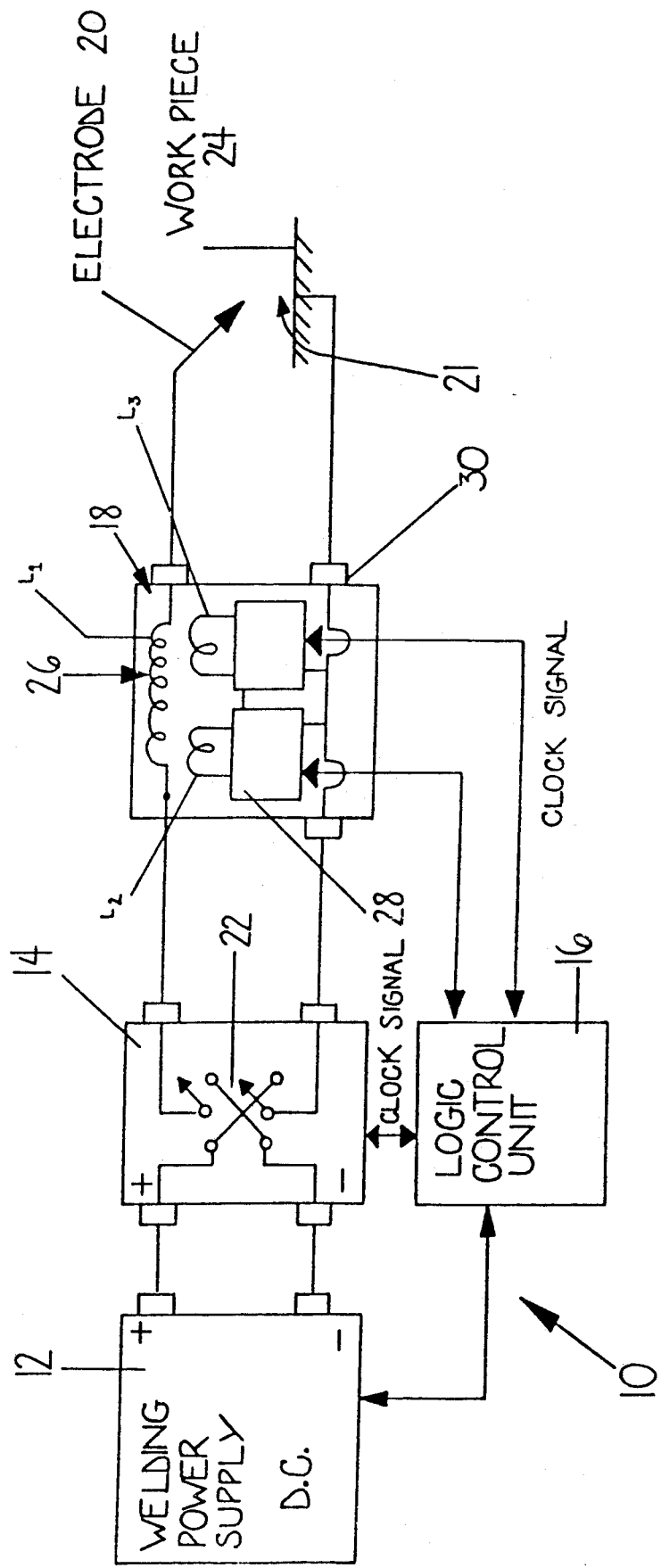
FIG. 1 is is a schematic illustration of the welding apparatus of the present invention.

FIG. 1 depicts the welding apparatus 10 of this invention, including a direct current arc power supply 12, a polarity control unit (PCU) 14, a logic control unit 16, an arc initiation unit 18, and a welding electrode 20. The welding electrode 20 is adjacent a workpiece 24, and there is a gap 21 between the tip of the electrode and the workpiece bridged by an electric arc during welding.

The power supply 12 typically has a constant current volt-ampere characteristic which is most suitable for TIG welding. A suitable power supply is the 2000A power supply sold by M. K. Products, Inc. of Irvine, Calif.

Control signals establishing all controllable parameters come from the logic control unit 16. These control signals include the power on/off signal, the output level command (current output) signal for the power supply 12, and a clock signal which is applied to both the polarity control unit 14 and the arc initiation unit 18. This clock signal, when applied to the polarity control unit 14, causes the polarity of the electrode 20 to reverse. When applied to the arc initiation unit 18, the clock signal enables this unit 18 to apply to the electrode 20, at the precise time, an arc initiation impulse to produce an arc across the gap 21.

The polarity control unit 14 includes a high speed current reversing switch 22, which has switching times of approximately one (1) microsecond and current capacities of three hundred (300) amperes. This polarity control unit 14 is controlled by the logic control unit 16 which provides electrode negative and electrode positive commands in response to the clock signal.

The arc initiation unit 18 is interposed between the polarity control unit 14 and the welding electrode 20. The workpiece 24 is connected through the arc initiation unit 18 and reversing switch 22 to the power supply 12. The electrode 20 connection passes through a high current transformer circuit 26. As explained in greater detail subsequently, the transformer circuit 26 couples arc initiation and arc reignition signals in series with the output welding current.

The transformer circuit 26 comprises a transformer having a pair of single turn primary windings $L_2$ and $L_3$, and a multi-turn secondary winding $L_1$ used to step up the voltage induced by currents in the winding $L_2$ or the winding $L_3$. The transformer circuit 26 is wound on a ferrite core (not shown) which provides excellent coupling between the one turn primary windings $L_2$ and $L_3$ and the multi-turn secondary winding $L_1$. As soon as current in excess of a few amperes flows through the secondary winding $L_1$, the core saturates and the transformer circuit has no effect on the welding current.

There is an arc initiation circuit 28 connected across the winding $L_2$ and an arc reignition circuit 30 connected across the winding $L_3$. The arc initiation circuit 28 is a conventional capacitor discharge circuit which permits non-contact arc initiation at the startup of each welding job. This arc initiation circuit 28 is often used to replace high frequency arc initiation systems in direct current TIG welding. A typical circuit 28 as used in the M.K. Products "Hot Shot" unit, modified in a conventional fashion to accommodate the present invention. This "Hot Shot" unit generates an impulse of approximately 1000 volts with very low current capability. This is transformed to about 14,000 volts (14 kilovolts) through the transformer action between the windings $L_2$ and $L_1$. This voltage level is sufficient to bridge the typical electrode-to-workpiece gap and ionize the shielding gas, permitting welding current to flow.

The arc ignition circuit 28 is controlled by the logic control unit 16, which establishes the parameters of power supply 12 for optimum arc initiation and then enables the arc ignition circuit. Using the "Hot Shot" unit, upon detection of welding current flow, all parameters of the power supply 12 are returned to the specified welding conditions. The arc may be initiated for DC welding with either electrode negative or electrode positive, but electrode negative is preferred at start up. This invention takes advantage of the existing transformer circuitry in the "Hot Shot" unit, including the winding $L_1$ and logic control unit 16 to provide a simplified welding apparatus 10.

The arc reignition circuit 30 (FIG. 2) is a capacitor discharge circuit with a voltage level about an order of magnitude less than the arc ignition circuit 28. This is consistent with the lower voltage requirements to reignite the electrode positive arc following the existence of an electrode negative arc. Preferably, the polarity of the induced voltage is opposite to that of the arc ignition circuit 28 output, which is optimized for electrode negative operation.

The arc reignition circuit 30 is controlled by the clock signal from the logic control unit 16, which synchronizes the operation of this circuit 30 with the polarity control unit 14 polarity reversals. This invention also insures that the voltage across the electrode 20 and the workpiece 24 is sufficient to sustain the reignition arc before the reignition circuit 30 is triggered. This is an important feature of the invention.

The polarity control unit 14 has an "off" time of a few microseconds when switching polarity to insure that both legs of the reversing switch 22 are not "on" at the same time. This means that the electrode negative voltage does not appear at the electrode 20 at the instant the polarity control unit 14 is switched. This characteristic is not essential to the invention, and the invention accommodates this characteristic to permit the use of less expensive, lower capacity switching devices. The arc reignition circuit 30 works equally well with a zero delay switch. In addition, the transformer circuit 26 goes out of saturation and presents a delay in current build-up at arc reignition. These factors are all accommodated in the arc reignition circuit 30 which provides a simple, highly effective means for arc reignition without the use of hazardous high voltage, high current sources.

ARC REIGNITION CIRCUIT

Figure 2:
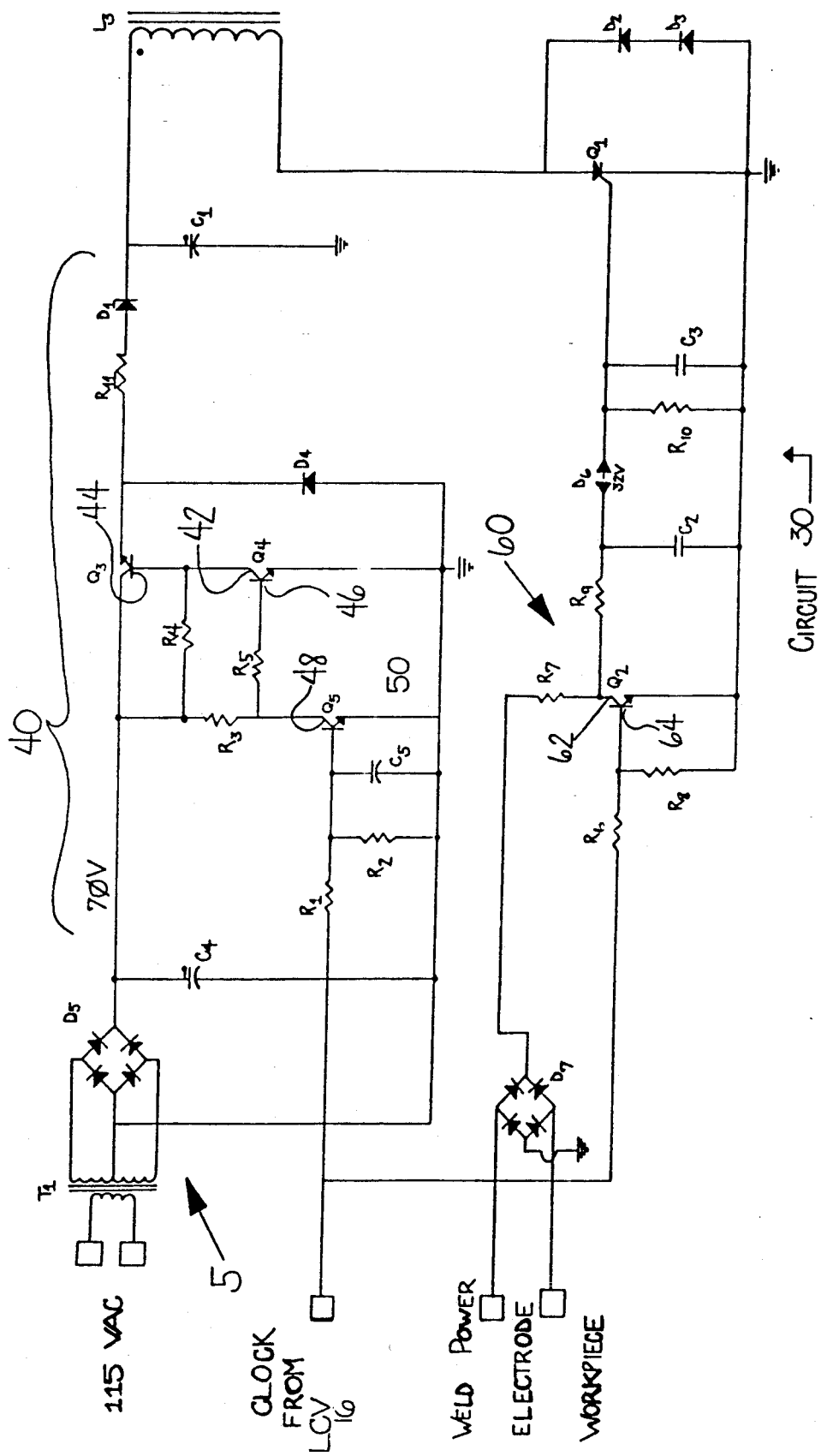
FIG. 2 is a schematic wiring diagram of the arc reignition circuit used in the welding apparatus depicted in FIG. 1.

FIG. 2 illustrates the arc reignition circuit 30. This circuit 30 provides a relatively low voltage (about 1000 volts) reignition impulse to the electrode 20 as the polarity of the electrode is switched from a negative polarity to a positive polarity during the welding-cleaning cycle. The reignition impulse is synchronized with the change in polarity, so that it is applied to the electrode 20 when the voltage differential between the electrode 20 and the workpiece 24 is sufficiently large to produce and sustain an electrical arc across the gap 21.

The arc reignition circuit 30 includes an isolated direct current source 5 of about 70 volts provided by a circuit including a transformer $T_1$, a diode bride $D_5$, and a capacitor $C_4$. This 70 volt direct current source 5 is connected via a transistor $Q_3$, a resistor $R_{11}$, and a diode $D_1$, which serves to limit current, to a capacitor $C_1$. The diode $D_1$ prevents current from the capacitor $C_1$ and negative pulses induced into the winding $L_3$ from flowing back into a charging circuit 40. The capacitor $C_1$ is charged during the interval when the electrode 20 is at a negative polarity, and discharged when the electrode 20 is at a positive polarity. The timing is controlled so that the capacitor $C_1$ discharges rapidly near the start of the electrode positive interval of the welding-cleaning cycle. The current capability of the direct current source 5 is determined by the amount of capacitance used for the capacitor $C_1$ and the frequency with which electrode positive intervals are introduced.

The charging circuit 40 is used to charge the capacitor $C_1$. This circuit 40 includes a transistor $Q_4$ having its collector 42 connected to the base 44 of a transistor $Q_3$. The base 46 of the transistor $Q_4$ is connected to the collector 48 of a transistor $Q_5$ through the resistor $R_5$. The base 50 of the transistor $Q_5$ is driven by a clock signal from the logic control unit 16 through a resistor $R_1$. The resistor $R_1$, a resistor $R_2$, and a capacitor $C_5$ form a low pass filter for the clock signals, reducing susceptibility to electrical noise. A resistor $R_4$ provides base bias for the transistor $Q_3$ and a resistor $R_3$ limits current through the transistor $Q_5$ when it is "on." The resistors $R_3$ and $R_5$ provide bias for the transistor $Q_4$.

Figure 3:
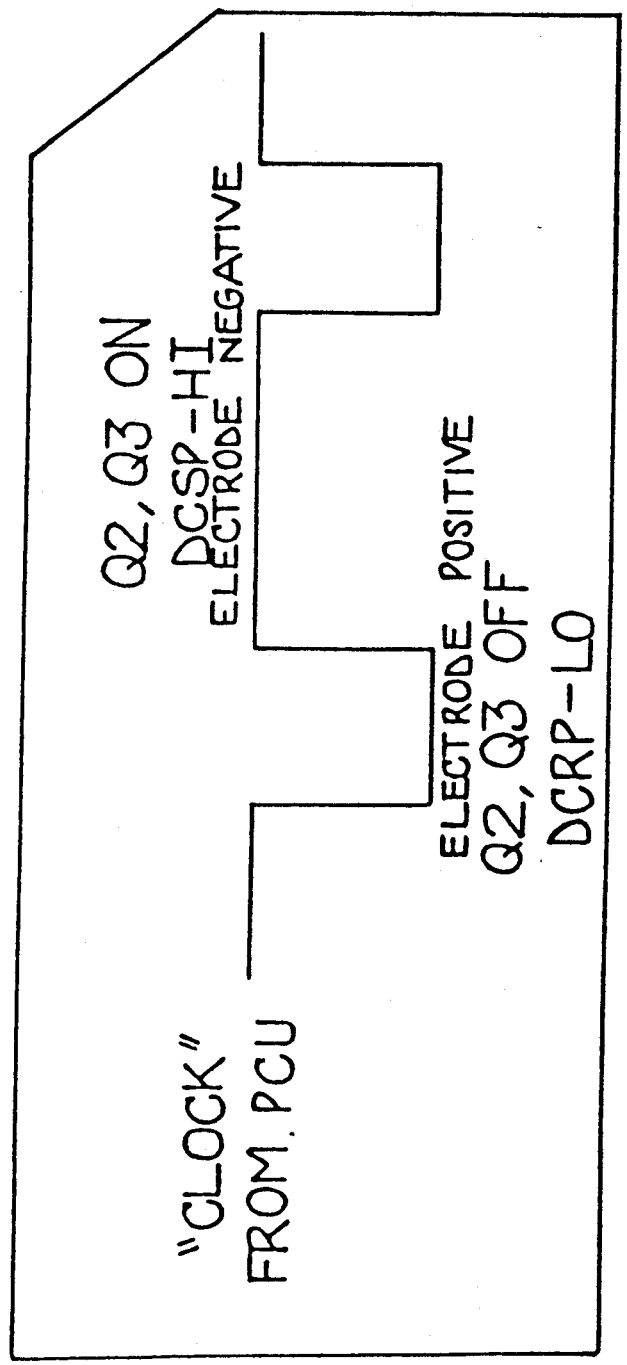
FIG. 3 is a schematic illustration of the clock signals for the circuit depicted in FIG. 2.

When the polarity control unit 14 is in the electrode negative state, the clock signal is high as illustrated in FIG. 3. This causes the transistor $Q_5$ to turn "on" to saturation, pulling the base 46 of the transistor $Q_4$ low, causing it to turn "off." This allows the resistor $R_4$ to pull the base 44 of the transistor $Q_3$ high, turning "on" this transistor $Q_3$. The 70 volt power supply charges the capacitor $C_1$ to 70 volts through the resistor $R_{11}$ and diode $D_1$. The resistor $R_{11}$ limits the initial in-rush of current to avoid damage to the transistor $Q_3$ and other circuit components.

The discharge of the capacitor $C_1$ is under the control of a circuit 60 which only allows the capacitor $C_1$ to discharge when an arc initiated between the workpiece 24 and the electrode 20 can be sustained. This circuit 60 rectifies the welding arc voltage to a positive voltage by a diode bridge $D_7$ and this voltage is applied to the collector 62 of a transistor $Q_2$ via a resistor $R_7$. The base 64 of the transistor $Q_2$ is biased by the "clock" voltage via resistors $R_6$ and $R_8$. During the electrode negative "clock" interval, the transistor $Q_2$ is held "on." The transistor $Q_2$ holds a capacitor $C_2$ discharged through a resistor $R_9$.

When the "clock" signal goes low as illustrated in FIG. 3, the transistor $Q_2$ is shut off. This occurs synchronously with the switching of the welding current output from electrode negative to electrode positive. Because of various circuit delays (for example, the transformer 26 is out of saturation and presents an inductive load to the welding voltage), it is desirable to delay the discharge of capacitor $C_1$ until the weld voltage has reached a value capable of supporting the arc when it is reignited. This delay is accomplished by using the weld power voltage to charge the capacitor $C_2$ after the transistor $Q_2$ is turned off. The charging current flows to the capacitor $C_2$ via resistor $R_7$ and $R_9$ and causes the voltage across the capacitor $C_2$ to build up. Since the arc is extinguished when the polarity is reversed, the weld voltage rises to the open circuit power supply voltage (50 volts in the proposed embodiment using the MK Products, Inc. 2000A).

A diac $D_6$, which has a sharp breakdown at a specified voltage, is used to regulate discharge of the capacitor $C_2$. When the diac $D_6$ breaks down, the energy stored in capacitor $C_2$ is used to trigger a thyristor $Q_1$. This provides a path for the capacitor $C_1$ to rapidly discharge through primary winding $L_3$. The welding current is zero, so the the core (not shown) of the transformer 26 is unsaturated. The current pulse in the winding $L_3$ induces a high voltage in the winding $L_1$, which is in series with the electrode 20. The discharge current to the workpiece 24 is returned to the capacitor $C_1$ via the ground path. A pair of diodes $D_2$ and $D_3$ prevent any current induced in the winding $L_3$ from causing reverse breakdown in the thyristor Q1. A resistor $R_{10}$ and a capacitor $C_3$ form a low pass filter to prevent electrical noise from triggering the thyristor Q1. Note that when the start up impulse is coupled into the winding $L_2$, an opposite polarity voltage of about the same magnitude is induced into the winding $L_3$ and appears across the thyristor Q1. The diodes $D_2$ and $D_3$ prevent negative voltages from damaging the thyristor Q1.

The discharge of the capacitor $C_1$, and resulting current in the winding $L_3$, induces a voltage in the winding $L_1$ which is stepped up by the ratio of turns between the winding $L_1$ and the winding $L_3$. The 70 volt primary impulse becomes approximately 980 volts at the electrode 20 in the preferred embodiment, which utilizes a ratio of 14:1. As soon as current starts to flow, the arc impedance drops to a very low value, the transformer 26 saturates, and the arc is maintained by current from the power supply 12 through the polarity control unit 14.

CIRCUIT OPERATION

As FIGS. 1 and 3 depict, the clock signals from the logic control circuit 16 control the operation of the PCU switch 22 and the arc reignition circuit 30.

When the polarity control unit 14 establishes the electrode negative condition, the clock signal is high. During this interval, the high clock signal turns on transistor $Q_5$ with current via the resistor $R_1$ to its base 50. The transistor $Q_5$ causes the voltage at the intersection of the resistors $R_3$ and $R_5$ to be near ground potential, bringing the base 46 of the transistor $Q_4$ to ground and turning the transistor $Q_4$ off. This, in turn, allows the resistor $R_4$ to pull the base 44 of the transistor $Q_3$ high, turning it "on" and allowing current from the 70 volt power supply 5 to flow through the current limiting resistor $R_{11}$ and the diode $D_1$ to charge the capacitor $C_1$ to 70 volts. The diode $D_1$ blocks voltage induced in winding $L_3$ from the arc start impulse in the winding $L_2$ and keeps current from flowing back into the power supply 5. The thyristor $Q_1$ is "off" and the diodes $D_2$ and $D_3$ are reverse biased so no current flows through the winding $L_3$. The resistors $R_1$ and $R_2$ and the capacitor $C_5$ form a low pass filter to prevent noise triggering of the transistor $Q_5$.

The same clock signal (FIG. 3) appears on the base 64 of the transistor $Q_2$ via the resistor $R_6$. The weld power is negative at this time, but it is rectified by the diode bridge $D_7$ and appears as a positive voltage at the resistor $R_7$ and on the collector 62 of the transistor $Q_2$. The high clock signal turns the transistor $Q_2$ "on," essentially grounding the resistor $R_9$, keeping the capacitor $C_2$ discharged. The diac $D_6$ blocks voltages less than its trigger voltage (32 volts in the preferred embodiment) from reaching the gate of the thyristor $Q_1$.

The system reaches a steady state condition during the electrode negative interval with the capacitor $C_1$ charged and capacitor $C_2$ discharged. When the logic control unit 16 causes the PCU switch 22 to switch, the weld power voltage becomes electrode positive. The clock signal goes low, causing the transistor $Q_5$ to turn off, the transistor $Q_4$ to turn on, and the transistor $Q_3$ to turn off, isolating the capacitor $C_1$ from the 70 volt power supply 5. The transistor $Q_2$ turns off and the weld voltage from diode bridge $D_7$ begins to charge capacitor $C_2$ via the resistors $R_7$ and $R_9$. The circuit 60 charging the capacitor $C_2$ insures that, following the PCU control clock signal change to a low state, the voltage across the electrode 20 and workpiece 24 has reached the trigger voltage of the diac $D_6$ before initiating the discharge of the capacitor $C_1$ through the winding $L_3$.

When the voltage of the capacitor $C_2$ exceeds the diac $D_6$ trigger voltage (32 volts), the capacitor $C_2$ discharges into the gate of of the thyristor $Q_1$, turning it on. This completes the circuit and the capacitor $C_1$ discharges through the winding $L_3$, inducing a voltage in the winding $L_1$ and consequently the electrode 20 that is higher than the capacitor $C_1$ voltage by the ratio of turns in the winding $L_1$ and $L_3$. The preferred ratio of 14:1 results in 980 volts. The energy available to reignite the arc is limited by the capacitance of the capacitor $C_1$ and the voltage applied. This minimizes the potential hazard to personnel.

Following the discharge and arc reignition, the circuit 30 again reaches a steady state condition during the remainder of the electrode positive interval with the capacitor $C_1$ discharged and isolated from the 70 volt supply. The capacitor $C_2$ will recharge from the welding voltage which is normally less than 32 volts during the electrode positive current flow, so that the diac $D_6$ will not retrigger. If, for any reason, the voltage across the capacitor $C_2$ reaches a value to trigger the diac $D_6$, the thyristor $Q_1$ will not fire because there is no voltage across its anode to cathode due to the discharged condition of the capacitor $C_1$. The diodes $D_2$ and $D_3$ protect the thyristor $Q_1$ from the inductive voltage spike generated in the winding $L_3$. The resistor $R_{10}$ and the capacitor $C_3$ prevent electrical noise from triggering the thyristor $Q_1$.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention.

I claim:

1. An arc reignition circuit that produces a reignited arc across an electrode and a workpiece after an initial arc has been extinguished by a reversal of polarity of the electrode, said arc reignition circuit including
   a transformer having an primary winding and a secondary winding, said electrode being connected to a power supply through a circuit including the secondary winding, and
   means responsive to the polarity of the electrode reversing for applying an electrical impulse of short duration to the primary winding to induce in the secondary winding a voltage which reignites the arc between the electrode and the workpiece.

2. The arc reignition circuit of claim 1 including means which controls the application of the electrical impulse, so that said impulse is applied when the voltage differential across the electrode and the workpiece is sufficiently large to sustain an arc.

3. The arc reignition circuit of claim 2 including means providing a clock signal which indicates when the polarity of the electrode reverses, said clock signal enabling the control means.

4. The arc reignition circuit of claim 1 where the means for applying the electrical impulse includes a capacitor.

5. The arc reignition circuit of claim 4 where the capacitor is charged when the electrode is at a negative polarity and discharged when the electrode is at a positive polarity.

6. Apparatus for welding a workpiece, including:
a welding electrode,
a power supply connected to the electrode to apply to the electrode a predetermined voltage that has either a negative or positive polarity,
means for controlling the polarity of the voltage of the electrode, including switch means for switching the polarity of the electrode,
control means which controls the operation of the switch means in a predetermined manner to create a welding phase and a cleaning phase, and
an arc reignition unit including
a transformer having first and second primary windings and a secondary winding, said electrode being connected to the power supply through a circuit including the secondary winding, and
a first circuit including the first primary winding and a first capacitor discharge circuit which produces, at start up, a first impulse of short duration to induce in the secondary winding a voltage which initiates an arc between the electrode and the workpiece that is extinguished upon the polarity of the electrode reversing,
a second circuit including the second primary winding and a second capacitor discharge circuit which produces a second impulse of short duration to induce in the secondary winding a voltage which reignites the arc between the electrode and the workpiece after being extinguished upon the polarity of the electrode reversing, and
means which controls the application of the second impulse to the electrode, so that said second impulse is applied to the electrode when the voltage differential across the electrode and the workpiece is sufficiently large to sustain an arc.

7. The welding apparatus of claim 6 where the control means provides a momentary power off phase as the polarity of the electrode is switched between polarities.

8. The welding apparatus of claim 6 where the first impulse applied to the electrode at start up has a higher voltage than the second impulse.

9. The welding apparatus of claim 6 where at start up a negative polarity is applied to the electrode.

10. The welding apparatus of claim 6 where a positive polarity is applied to the electrode when the arc is reestablished.

11. The welding apparatus of claim 6 where the transformer has a core which saturates when a low current flows through secondary winding.

12. In welding apparatus for welding a workpiece under an ionized gas, where the welding apparatus has an electrode connected to a power supply which applies to the electrode a predetermined voltage of either a negative or positive polarity, the combination comprising
means for controlling the polarity of the voltage at the electrode, including switch means for reversing the polarity of the electrode,
control means which controls the operation of the switch means, and
an arc reignition unit including
a transformer having a primary winding and a secondary winding, said electrode being connected to the power supply through a circuit including the secondary winding, and
means responsive to the polarity of the electrode reversing polarity for applying an electrical impulse of short duration to the primary winding to induce in the secondary winding a voltage which reignites the arc between the electrode and the workpiece.

13. In welding apparatus of claim 12 including means which controls the application of the impulse, so that said impulse is applied to the electrode when the voltage differential across the electrode and the workpiece is sufficiently large to sustain the arc.

14. The welding apparatus of claim 12 where the means for applying the impulse is a capacitor discharge circuit which is charged to a moderate voltage while the electrode is at negative polarity so that the voltage across the electrode and the workpiece does not exceed about 1500 volts at reestablishment of the arc 15. The welding apparatus of claim 14 including means for discharging the capacitor discharge circuit through the primary winding with each transition of the polarity of the electrode from negative to positive.

16. The welding apparatus of claim 15 where the capacitor discharge circuit is discharged when the voltage across the electrode and workpiece reaches a predetermined level to provide good welding performance.

17. In welding apparatus for welding a workpiece under an ionized gas, where the welding apparatus has an electrode connected to a power supply which applies to the electrode a predetermined voltage of either a negative or positive polarity, the combination comprising
a polarity control unit for controlling the polarity of the voltage at the electrode, including switch means for switching the polarity at the electrode,
control means which controls the operation of the switch means in a predetermined manner to create a welding phase with the electrode at a negative polarity and a cleaning phase with the electrode at a positive polarity, and
an arc reignition circuit for reestablishing the arc after start up when the polarity of the electrode is switched between a negative and a positive polarity, said arc reignition circuit including
a transformer having an primary winding and a secondary winding, said electrode being connected to the power supply through a circuit including the secondary winding, and
means responsive to the polarity of the electrode reversing polarity for applying an electrical impulse of short duration to the primary winding to induce in the secondary winding a voltage which reignites the arc between the electrode and the workpiece,
said means for applying an electrical impulse including a capacitor and charging means to charge the capacitor while the electrode is at negative polarity, means to isolate electrically the charging means from the power supply when the polarity of the electrode is positive, and means for discharging the capacitor to provide said impulse which is applied to the primary winding, and means for synchronizing the capacitor discharge with each transition of the polarity of the electrode from negative to positive.

18. The welding apparatus of claim 17 where the control means provides a momentary power off phase as the polarity of the electrode is switched between polarities.

* * * * *